United States Patent Office 3,018,191
Patented Jan. 23, 1962

3,018,191
PROCESS OF GOLD COATING CERAMIC SURFACES AND ARTICLES PRODUCED THEREBY
Louis Caban, Little Falls, and Frank L. Reusche, Livingston, N.J., assignors to L. Reusche & Co., Newark, N.J., a corporation of New Jersey
No Drawing. Filed June 1, 1959, Ser. No. 817,033
7 Claims. (Cl. 117—70)

This invention relates to the art of decorating non-porous ceramic surfaces by thin adherent films of gold, platinum or palladium. The invention is particularly concerned with gold film compositions used for decorating purposes, processes for adhering such compositions to non-porous or vitreous ceramic surfaces, compositions of vitreous coatings for covering these metallic films, processes of applying and fusing these coatings, and to articles of manufacture produced as the result of such processes.

It is now customary to apply gold to ceramic surfaces in the form of a "liquid bright gold" preparation, which is an organo-gold-containing liquid preparation compounded as a base material comprising essentially an organo-gold compound, organic compounds of certain other metals such as rhodium, bismuth and chromium in small amounts, and a vehicle or solvent therefor. The organo-gold compound may be a gold resinate, mercaptide or other organic sulfide.

The vehicle may be an essential oil, such as oil of rosemary, oil of sassafras, oil of lavender, turpentine, pinene, long-chain fatty acids and many others. This preparation, when applied to non-porous ceramic surfaces and fired to volatilize or burn off the organic matter present, forms thin, lustrous gold films. Such films do not have the adherence, hardness or detergent resistance of vitreous coatings; therefore, manufactured articles, thus decorated, and protected with a glassy coating, will greatly expand these qualities of the decoration.

Similar preparations containing platinum or palladium in addition to the gold are known as liquid bright platinum and liquid bright palladium, respectively. Throughout this specification, the term "liquid bright gold" is used so as to include these preparations, and the term "golden gloss" is used so as to include the silvery, white metallic color of these preparations.

Previous attempts at covering the fired films of liquid bright gold with a vitreous coating have failed due to several reasons. The gold film is volatilized and destroyed by repeated firings at higher temperatures. Furthermore, the fluxes, or glaze, of the top coat produced fading, matting, cracking and discoloration of the gold decoration upon the ceramic article. Also the desirable golden appearance of the gold decoration was destroyed by the corrosive action of the melted glass cover coat at the elevated maturation temperature.

Experiments have shown that the gold fading out may be caused by repeated firing of the gold decoration, by the composition of the top glass coat or by overfiring the top glass coat. Gold cracking may be caused by overfiring the gold or by overfiring the top glass coat. Gold discoloration is usually due to the composition of the top coat.

It is an object, therefore, of the present invention to provide a gold decoration upon a suitable ceramic base, and to protect it against destructive and corrosive actions of glass cover coatings without detracting from a desirable golden, bright decorative appearance.

Another object is to eliminate gold fading, cracking and discoloration in these gold decorated ceramic objects, which may be caused by repeated firing of the gold decorative composition, overfiring the top glass coat, or by composition of the top glass.

A further object is to eliminate fading, discoloration, and matting of the liquid bright gold decorative designs when covered with fluxes and glazes.

An additional object of the present invention is to provide a liquid bright gold composition which could withstand a plurality of firings at higher temperatures than heretofore possible without causing cracking or fading of the gold composition before application to and firing of the top glass coat applied on the ceramic object.

Still another object is to provide long-lasting protection of the gold decorative designs by means of a glass cover coat which will not destroy the effectiveness of the decoration through fading, matting or discoloration upon maturation.

Yet another object is the provision of a glass coating which has the required properties of transparency, whether colorless or tinted, which is compatible with the decoration and the base, which promotes the golden gloss in the decoration and the base, which effectively resists temperature changes and which has adequate alkali and acid resistance.

Yet another object of the present invention is the provision of a glass coating which has the required properties of translucency and textured surface, which is compatible with the decoration and the base, which promotes the golden gloss in the decoration, which effectively resists temperature changes and which has adequate acid and alkali resistance.

Another object of the invention is the provision of ceramic or vitreous ware which has been decorated with gold over which has been fired a vitreous coating, including china dinnerware, semi-vitreous earthenware, hotel chinaware, architectural porcelain enamel, ceramic tiling, glass tableware and tumblers, beverage bottles, glass containers, electrical and electronic ceramics, artware of all types and many others, which will be durable in use and most effective in appearance.

Other objects of the invention will become apparent in the course of the following specification.

An illustrated flow sheet is as follows:

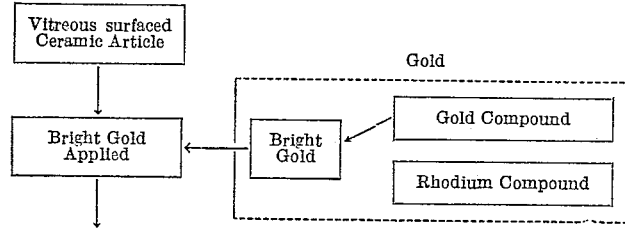

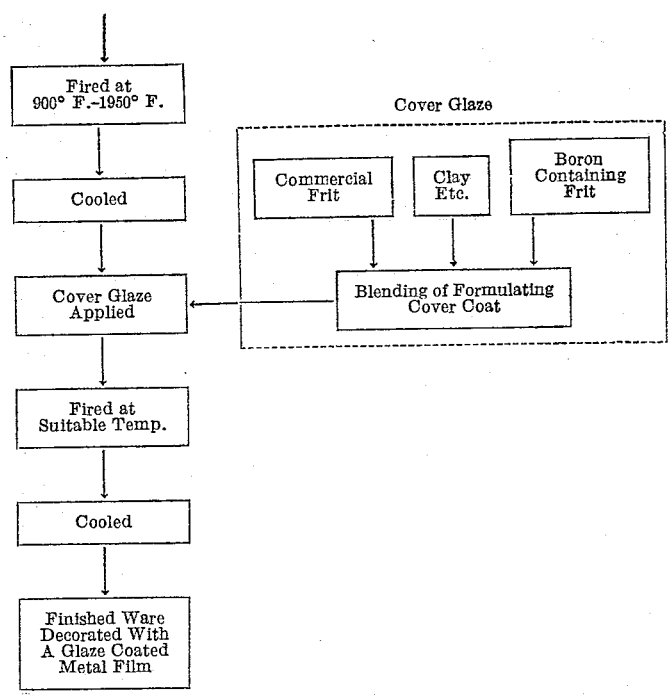

The present invention is based in part upon the discovery, which was later substantiated by numerous experiments, that when a specific very large amount of rhodium is added to the liquid bright gold compound—an amount which would be considered excessive by prior art standards—the compound thus produced is capable, not only of withstanding repeated firings, and higher than usual firing temperatures, but particularly of withstanding the corrosive attack of the melted glass coating at these temperatures.

In prior art liquid bright gold compounds, small amounts of rhodium were used to help in the development of the characteristic mirror-like sheen of bright gold decorations.

However, in accordance with the present invention, the ratio of the respective rhodium (Rh) metal to gold metal in the bright gold must be (by weight) from 0.45 part to 5.68 parts of rhodium metal to 100 parts of gold metal.

The specific ratio of rhodium to gold is dependent upon the temperature to which the gold is fired. This in turn is dependent upon the nature of the ceramic base upon which the gold decoration has been applied.

As a result of the proportioning of the Rh metal to the gold metal in accordance with the present invention, the gold composition is able to withstand repeated firings at higher than usual firing temperatures. Gold fading, cracking and discoloration of the design caused by overfiring the gold, overfiring the top glass coat, or firing the gold decoration more than once, are eliminated. Likewise, the destructive action on the gold design caused by the corrosive action of the melted cover coat is greatly reduced.

The liquid bright gold compound of the present invention may be fired at temperatures under the melting point of the rhodium-gold alloy. In practice, this may be from 900° F. to 1950° F. The melting of the metallic film is the limiting factor at elevated temperatures, while at lower temperatures it is the fusion of the glassy cover coat. At these temperatures the gold compound will adhere to the base sufficiently to permit handling and further operational steps which will be described hereinafter. The gold compound may be prepared for application by hand, by suitable mechanical means, or by any other means used for decorating purposes.

In addition to the very large amount of rhodium above described, the gold compound may include other suitable metals, such as bismuth, silicon, chromium and others. These would be designed as organo-metallics.

The following examples of the preparation of the liquid bright gold compound of the present invention are given by way of examplification only:

EXAMPLE I

*Gold compound*

A mixture of 160 grams of Venice turpentine in 800 grams of turpentine is heated to 160° C., and reacted with 160 grams of sulfur flowers. The resulting hard resin is dissolved in 500 grams oil of lavender spike.

320 grams of gold metal is dissolved in a mixture of 2,980 grams of hydrochloric acid, and 1,280 grams of nitric acid. This acid mixture is commonly known as aqua regia.

The sulfured terpene solution is heated to 80° C., and the gold solution added with stirring. A vigorous exothermic reaction results as the gold compound is formed, dropping out of solution as a black oily mass. This is separated, washed, till neutral, assayed and adjusted to a standard percentage of gold, in this case 25% gold, by weight.

EXAMPLE II

*Rhodium compound*

This compound may be readily made by reacting a solution of rhodium chloride with a suitable thio-terpene. After reaction, it must be washed, assayed and adjusted to a standard percentage of rhodium.

EXAMPLE III

*Bright gold*

| | Grams |
|---|---|
| Rhodium compound | 10 |
| Gold compound | 280 |

This material has a gold/rhodium ratio about 10% higher than that normally used in bright gold compositions, and is used for the lower decorating temperatures.

EXAMPLE IV

*Bright gold*

| | Grams |
|---|---|
| Rhodium compound | 40 |
| Gold compound | 250 |

The increase of the gold/rhodium ratio in this product makes this material entirely suitable for use at temperatures up to 1700° F.

EXAMPLE V

Bright gold

| | Grams |
|---|---|
| Rhodium compound | 100 |
| Gold compound | 275 |

This shows the tremendous increase in the gold/rhodium ratio which can be tolerated. The material can be used at temperatures in excess of the melting point of gold alone.

It is understood that the present invention is not limited to the above methods of making gold and rhodium compounds. It is further understood that the above formulae for bright golds are meant to show a range of gold/rhodium ratio.

EXAMPLE VI

Palladium compound

This compound may be made by reacting a solution of palladium chloride with a suitable thio-terpene. After reaction, it must be washed, assayed and adjusted to a standard arbitrary percentage of palladium.

EXAMPLE VII

Platinum compound

This compound may be made by reacting a solution of platinum chloride with a suitable thio-terpene. After reaction, it must be washed neutral, assayed, and adjusted to a standard arbitrary percentage of platinum.

EXAMPLE VIII

Bright palladium

| | Grams |
|---|---|
| Rhodium compound | 10 |
| Gold compound | 260 |
| Palladium compound | 60 |

EXAMPLE IX

Bright platinum

| | Grams |
|---|---|
| Rhodium compound | 10 |
| Gold compound | 260 |
| Palladium compound | 60 |

In the above examples of Bright palladium and Bright platinum, the formulation is made so that the rhodium/gold ratio of the Bright gold examples is the same as the rhodium/gold-palladium, or rhodium/gold-platinum ratios of these.

Previous experimentation of bright gold films on glasses of various compositions showed that the color of the film in contact with the glass was most golden when used on boro-silicate glasses. This observation led to the development of a glass coating, which also constitutes a part of the present invention, and which is most effective for use in conjunction with the novel gold compound.

The characteristic feature of the glass coating is that it must contain boron in order to give the most desirable results The glass cover coating is constituted essentially of compounds such as boron oxide ($B_2O_3$), potassium oxide ($K_2O$) and lithium oxide ($Li_2O$) which are fused with silica ($SiO_2$) and which are particularly adapted in their specific proportions to protect the coating of gold, platinum or palladium more thoroughly and effectively. A greater degree of brightness and a true golden color upon maturing the ceramic object are some of the more salient features attained by the cover coat. Other desirable features are that a greater degree of adherence of the cover coat to the decorative gold designs is effected, dissolution of the metallic gold at maturation is eliminated, and the gold film is not cracked and torn by the cover coat.

It should be noted in this connection that boron oxide promotes brightness and true color of decoration, although it tends to dissolve the metallic film. On the other hand, potassium oxide tends to prevent the dissolution of metallic decoration at the maturing of the covering glass coat. The function of the lithium carbonate is to promote the adherence of the covering glass coat to the metallic decoration.

Compounds of sodium can be substituted for those of potassium although generally there is a darkening of color.

In practice it has been found that certain boron containing glazes can be used as a cover glaze over the novel gold compound outlined previously. However, in order to widen the scope of use, a fundamental material is made, such that, when it is added to certain other available frits, fluxes and glazes, it will form a coating which will be compatible with the gold decoration and with the ceramic base on which it is placed.

In order to prepare these compounds for this use, they should be melted with silica, and poured into water when molten, to form an insoluble, shattered, glassy mass called a frit. When this frit is ground fine, it is ready for use.

The following frit ranges in parts by weight were found to be effective for the purposes of the present invention:

| | |
|---|---|
| $B_2O_3$ | 70 to 30 |
| $K_2O$ | 30 to 15 |
| $Li_2O$ | 16 to 3 |
| $SiO_2$ | 30 to 15 |

This type of formulation is particularly effective where the material is to be applied in an oily medium, although it can also be used with a water-based medium.

For top coats which are to be applied only in water-based mediums, in the nature of a glaze, for example, $Li_2O$ can be eliminated from the frit, and there can be added as a mill addition the equivalent amount of lithium carbonate ($Li_2CO_3$).

The actual amount of the above to be used with a commercial frit depends on the amount of such ingredients already available in the commercial frit, since the total amount must provide the necessary brightness of golden metallic color and coverage of the metallic decoration.

By way of example, the following frit compositions indicated in parts by weight may be used:

EXAMPLE X

Frit I

| | Percent |
|---|---|
| $K_2O$ | 25 |
| $B_2O_3$ | 53.5 |
| $SiO_2$ | 21.5 |

EXAMPLE XI

Frit II

| | |
|---|---|
| $K_2O$ | 22 |
| $Li_2O$ | 11.5 |
| $B_2O_3$ | 47.5 |
| $SiO_2$ | 19 |

EXAMPLE XII

Frit III

| | |
|---|---|
| $K_2O$ | 24.2 |
| $CaO$ | 1.2 |
| $B_2O_3$ | 52 |
| $SiO_2$ | 22.6 |

The following are examples of commercial frits with which the final coatings are developed.

EXAMPLE XIII

*Commercial frit A*

| | Percent |
|---|---|
| PbO | 77.5 |
| B$_2$O$_3$ | 16 |
| SiO$_2$ | 6.5 |

Firing temperature—1020° F.

EXAMPLE XIV

*Commercial frit B*

| | |
|---|---|
| PbO | 68.7 |
| ZnO | 1.9 |
| CdO | 5.2 |
| BaO | .5 |
| CaO | .4 |
| B$_2$O$_3$ | 10.5 |
| SiO$_2$ | 12.8 |

Firing temperature—1040° F.

EXAMPLE XV

*Commercial frit C*

| | |
|---|---|
| Na$_2$O | 6.4 |
| PbO | 59.2 |
| B$_2$O$_3$ | 14.4 |
| SiO$_2$ | 20.0 |

Firing temperature—1040° F.

EXAMPLE XVI

*Commercial frit D*

| | |
|---|---|
| Na$_2$O | 1.5 |
| PbO | 71.2 |
| Al$_2$O$_3$ | 2.4 |
| SiO$_2$ | 24.9 |

Firing temperature—1300° F.

EXAMPLE XVII

*Commercial frit E*

| | |
|---|---|
| Na$_2$O | 3.6 |
| CaO | 4.5 |
| PbO | 31.0 |
| Al$_2$O$_3$ | 3.4 |
| B$_2$O$_3$ | 13.1 |
| SiO$_2$ | 43.5 |
| ZrO$_2$ | 1.0 |

Firing temperature—1460° F.

EXAMPLE XVIII

*Commercial frit F*

| | |
|---|---|
| PbO | 61.3 |
| Al$_2$O$_3$ | 3.1 |
| SiO$_2$ | 35.6 |

Firing temperature—1500° F.

EXAMPLE XIX

*Commercial frit G*

| | |
|---|---|
| Na$_2$O | 10.4 |
| CaO | 20.0 |
| B$_2$O$_3$ | 23.3 |
| SiO$_2$ | 46.3 |

Firing temperature—1500° F.

From the foregoing, the final top coatings may be readily formulated, as in the following examples.

EXAMPLE XX

*Coating 1*

| | Percent |
|---|---|
| Frit II | 20 |
| Commercial frit B | 80 |

Base: glass, opal, heat resistant opal, porcelain enamel.
Temperature: 1050°–1150° F.

EXAMPLE XXI

*Coating 2*

| | Percent |
|---|---|
| Frit I | 16.5 |
| Commercial frit A | 73.5 |
| EPK clay | 5.0 |
| Lithium carbonate | 5.0 |
| Borax | 0.5 |

Base: Cone 06 glazed pottery.
Temperature: 1250°–1350° F.

EXAMPLE XXII

*Coating 3*

| | |
|---|---|
| Frit I | 16.5 |
| Commercial frit A | 3.0 |
| Commercial frit D | 69.3 |
| EPK clay | 6.2 |
| Lithium carbonate | 5.0 |
| Borax | 0.5 |

Base: Wall tile.
Temperature: 1250°–1350° F.

EXAMPLE XXIII

*Coating 4*

| | |
|---|---|
| Frit II | 38.0 |
| Commercial frit F | 52.7 |
| Commercial frit C | 3.1 |
| EPK clay | 6.2 |

Base: Wall tile, pottery, earthenware.
Temperature: 1300°–1350° F.

EXAMPLE XXIV

*Coating 5*

| | |
|---|---|
| Frit I | 16.5 |
| Commercial frit A | 4.2 |
| Commercial frit G | 69.3 |
| EPK clay | 5.0 |
| Lithium carbonate | 5.0 |
| Borax | 0.5 |

Semi-transparent, semi-matt.
Base: Artware, wall tile.
Temperature: 1400° F.

EXAMPLE XXV

*Coating 6*

| | |
|---|---|
| Frit III | 12.7 |
| Commercial frit C | 14.4 |
| Commercial frit E | 60.4 |
| Bentonite | 7.0 |
| Lithium carbonate | 5.0 |
| Borax | 0.5 |

Base: Hotel china.
Temperature: 1650° F.

These examples of glass coatings of the present invention are given by way of exemplification only.

The present invention also includes methods of applying the liquid bright metal coatings to ceramic surfaces and applying glass cover coatings to the metal coatings, which are characterized by the following steps illustrated upon the flow sheet:

The liquid bright gold composition of the present invention is applied to predetermined surface areas of a non-porous or glossy ceramic base, either manually, as by means of a brush, or mechanically, as by stamping, or silk screen process, or some type of decorating machine, or by any other means used in the art of decorating. The article is then fired to a temperature, generally between 900° F. and 1950° F., as described previously, which is sufficient to volatilize the organic material present and to form a thin lustrous gold film thereon. This firing temperature is primarily dependent upon the ceramic base to be used, and determines the ratio of rhodium metal to gold metal in the bright gold composition.

Excellent and satisfactory results are to be had regardless of the type of ceramic base used, whether glass, china or porcelain enamel, as long as the base is non-porous and vitreous, and a suitable composition for both bright gold and top cover coat is chosen from the range set forth here.

After this first firing of the bright gold decoration, the above described glass cover coating is applied over the metallic film. The cover coat can be mixed with water and applied in a manner similar to a ceramic glaze or porcelain enamel, or it can be mixed with any suitable oil medium and applied in a manner similar to a ceramic color. The methods of application include brushing, spraying, dipping, stamping, screening, dusting, printing or any other means used in the art of decorating.

Thereupon, the article provided with the two coatings is fired for a second time at a temperature dependent upon the fusion point of the cover coat used, generally ranging from about 1000° F. to about 1950° F.

After this second firing, the article is cooled and is ready for use. It was found that the above-mentioned metal and glass coatings enhance the color of the decoration, prevents corrosion of the metal film by outside agents, prevents abrasion of the metallic film, and provides a permanent protective coating.

The following examples of the process are given to illustrate how the present invention may be carried out in practice, but they are not intended to limit the scope of the invention:

EXAMPLE XXVI

Base—Beverage bottle
Gold—Bright gold, Example III
    Application—roller decorating machine
    Firing—continuous lehr, 1080° F. peak temperature
Top coat—Coating 1, Example XX, ground in oils
    Application—roller decorating machine
    Firing—continuous lehr, 1080° F. peak temperature.

EXAMPLE XXVII

Base—Architectural porcelain enamel paneling
Gold—Bright gold, Example III
    Application—spray gun
    Firing—continuous enameling furnace, 1400° F.
Top coat—Coating 1, Example XX, ground in spraying oil
    Application—spray gun
    Firing—continuous enameling furnace, 1400° F.

EXAMPLE XXVIII

Base—Low-fire Cone 06 pottery, such as that made by ceramic hobbyists.
Gold—Bright gold, Example III
    Application—brush
    Firing—studio kiln, 1300° F.
Top coat—Coating 2, Example XXI, ground in water.
    Application—brush, in the manner of a glaze
    Firing—studio kiln, 1300° F.

EXAMPLE XXIX

Base—Ceramic wall tile
Gold—Bright gold, Example III
    Application—spray gun
    Firing—continuous tunnel kiln, 1300° F. peak temp.
Top coat—Coating 3, Example XXII
    Application—spray gun
    Firing—continuous tunnel kiln, 1300° F. peak temp.

EXAMPLE XXX

Base—Semi-vitreous earthenware
Gold—Bright gold, Example III
    Application—roller decorating machine
    Firing—continuous decorating kiln, 1350° F. peak temp.
Top coat—Coating 4, Example XXIII
    Application—roller decorating machine
    Firing—continuous decorating kiln, 1350° F. peak temp.

EXAMPLE XXXI

Base—Hotel china
Gold—Bright gold, Example IV
    Application—brush
    Firing—continuous tunnel kiln, 1600° F., peak temp.
Top coat—Coating 6, Example XXV
    Application—brush
    Firing—continuous tunnel kiln, 1600° F. peak temp.

Repeated tests have shown that the liquid bright gold decoration of the present invention will withstand repeated firings without fading, withstand higher than ordinary firing temperatures without cracking, and retain its color and gloss for an indefinite time.

It is also apparent that this invention provides a glass cover coat which is transparent, colorless, compatible with the ceramic base and the gold decoration, promotes a golden gloss, resists excessive temperatures and abrupt temperature changes, and resists the corrosive effects of acid and alkaline conditions.

It is to be understood that the present invention is not restricted to any of the specific proportions, procedures, or ingredients hereinabove described, but includes all such variations, modifications, and equivalents as fall within the scope of the appended claims.

What is claimed is:

1. As an article of manufacture, a ceramic article having a non-porous surface, a metal film thereon comprising rhodium and a metal selected from the group consisting of gold, platinum and palladium, the ratio of the respective Rh and other metal parts thereof being from 0.45/100 to 5.68/100, and a glass cover coat protectively covering said metal-coated surface.

2. As an article of manufacture, a ceramic article having a non-porous surface, a predominately gold film having gold and rhodium in such amounts that the ratio of the respective Rh and Au metal parts thereof is from 0.45/100 to 5.68/100, and a boron-containing glass coating upon said film.

3. An article in accordance with claim 2, wherein said glass coating contains boron oxide, a compound selected from the class consisting of potassium oxide and sodium oxide, silicon oxide, and a compound selected from the class consisting of lithium carbonate and lithium oxide.

4. As an article of manufacture, a ceramic article having a non-porous surface, a predominately gold film thereon having gold and rhodium, and a boron-containing glass coating upon said film.

5. As an article of manufacture, a ceramic article having a non-porous surface, a predominately gold film thereon having gold and rhodium in such amounts that the ratio of the respective Rh and Au parts is from 0.45/100 to 5.68/100, and a glass coating, in which is included a frit, which frit contains 70 to 30 parts by weight boron oxide, said glass coating covering said film.

6. In a process of gold coating a ceramic article, the steps of preparing a liquid bright gold composition having a rhodium compound wherein the ratio of the respective Rh and Au parts is from 0.45/100 to 5.68/100 by weight, applying a thin layer of said composition to a surface of said ceramic article, firing the coated surface to produce a gold decorative film, applying a thin layer of a glass boron-containing coating to the fired gold decorative film, and again firing the coated surface to produce a protective glass cover coating thereon.

7. A process in accordance with claim 6, wherein the first firing step takes place at temperatures ranging between 900° F. and 1950° F., and the second firing step takes place at temperatures ranging between 950° F. and 1950° F.

References Cited in the file of this patent

UNITED STATES PATENTS

| | | |
|---|---|---|
| 2,490,399 | Ballard | Dec. 6, 1949 |
| 2,653,877 | Deyrup | Sept. 29, 1953 |
| 2,701,214 | Velonis et al. | Feb. 1, 1955 |
| 2,733,167 | Stookey | Jan. 31, 1956 |
| 2,759,854 | Kilby | Aug. 21, 1956 |
| 2,855,493 | Tierman | Oct. 7, 1958 |
| 930,106 | Wrotnowski | Mar. 29, 1960 |